United States Patent [19]

König et al.

[11] 4,108,842
[45] Aug. 22, 1978

[54] PREPARATION OF POLYURETHANE UREAS USING AS HARDENERS MIXTURES OF WATER, AMINES, ALDIMINES AND KETIMINES

[75] Inventors: Eberhard König, Leverkusen; Josef Pedain, Cologne; Karl-Arnold Weber, Leverkusen; Manfred Hajek, Cologne, all of Germany

[73] Assignee: Bayer Aktiengesellschaft, Leverkusen, Germany

[21] Appl. No.: 822,297

[22] Filed: Aug. 5, 1977

[30] Foreign Application Priority Data

Aug. 18, 1976 [DE] Fed. Rep. of Germany ....... 2637115

[51] Int. Cl.² ...................... C08G 18/32; C08G 18/14; C08K 5/41; C08K 5/07
[52] U.S. Cl. ................. 528/61; 260/32.8 N; 428/425; 528/64
[58] Field of Search ................ 260/75 NH, 77.5 AM, 260/32.8 N, 32.8 DS

[56] References Cited

U.S. PATENT DOCUMENTS

| | | | |
|---|---|---|---|
| 3,493,543 | 2/1970 | Nazy et al. | 260/77.5 CH |
| 3,554,974 | 1/1971 | Mommaerts et al. | 260/72 |
| 3,567,692 | 3/1971 | Haggis et al. | 260/75 NH |
| 3,699,063 | 10/1972 | Scheibelhoffer | 260/18 TN |
| 3,784,521 | 1/1974 | Finelli et al. | 260/75 NB |
| 3,793,417 | 2/1974 | Erickson et al. | 260/77.5 AM |
| 3,932,357 | 1/1976 | Schmitt et al. | 260/75 NH |
| 3,972,846 | 8/1976 | Mori et al. | 260/30.4 N |
| 4,009,307 | 2/1977 | Erickson et al. | 427/377 |

Primary Examiner—H.S. Cockeram
Attorney, Agent, or Firm—Gene Harsh; Lawrence S. Pope; Frederick H. Colen

[57] ABSTRACT

The present invention relates to a process for the production of polyurethane ureas from a prepolymer which contains isocyanate groups and a mixture of hardeners containing amino groups, in the presence of water, and optionally in the presence of solvents, characterized in that the mixture of hardeners comprises compounds corresponding to the following general formulae:

$$H_2N-R-NH_2 \quad (A)$$

$$H_2N-R-N=R_1 \quad (B)$$

and $$R_1=N-R-N=R_1 \quad (C)$$

wherein
R represents a divalent aliphatic, cycloaliphatic or araliphatic group having from 2 to 18 carbon atoms and optionally also containing —O— or

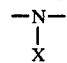

(wherein X represents H, —CH₃, —C₂H₅, —C₃H₇ or —C₄H₉) and
R₁ represents an aliphatic or cycloaliphatic group such as may be obtained by removal of the oxygen from a ketone or aldehyde having from about 2 to 8, preferably from about 3 to 6, carbon atoms, in which mixture the following molar ratios should be observed:
A/B + C = from about 1:20 to 1:3, preferably from about 1:10 to 1:5;
B/C = from about 1:2 to 2:1, preferably from about 1:1.5 to 1.5:1; and
A + B + C/H₂O = from about 1:1.4 to 1:20, preferably from about 1:1.4 to 1:10.

11 Claims, No Drawings

PREPARATION OF POLYURETHANE UREAS USING AS HARDENERS MIXTURES OF WATER, AMINES, ALDIMINES AND KETIMINES

FIELD OF THE INVENTION

This invention relates to a low solvent process for the preparation of polyurethane ureas which may be used for lacquering, coating and laminating sheet-like structures and for the manufacture of sheets and films.

BACKGROUND OF THE INVENTION

Polyurethane ureas are generally prepared by reacting an isocyanate group containing prepolymer with polyamines. Polyurethane ureas are of considerable technical importance and are widely used, for example, for coatings and impregnations, for the manufacture of sheets and films and in the field of elastomers.

According to the present state of the art, various methods are used for controlling the exothermic reaction of polyamines with polyisocyanates. For example, one method frequently used involves using polyamines which, by virtue of their chemical nature, are less reactive with polyisocyanates. They are mainly aromatic polyamines whose reactivity is reduced by electron-attracting substituents on the aromatic nucleus. These aromatic polyamines may be homogeneously mixed with isocyanate prepolymers in suitable machines. The mixtures remain liquid for a sufficient length of time to enable them to be cast, sprayed or applied by knife-coating.

Aromatic polyamines do, however, have various disadvantages; for example, they are, in some cases, physiologically suspect an they undergo yellowing in air and light so that they are unsuitable for the production of light-fast coatings and lacquers.

Aliphatic and cycloaliphatic diamines which do not give rise to these difficulties could not hitherto be converted to polyurethane ureas by any satisfactory process. According to the present state of the art, the preparation of polyurethane ureas from aliphatic polyamines may only be carried out in a dilute phase, for example, using a large excess of solvent. It is only in a second stage of the process that the polyurethane urea may be worked-up into the end-product, for example, a coating, and this operation is accompanied by evaporation of the solvent, which not only requires expenditure of energy, but also has the disadvantage that the solvent must be recovered for ecological and economic reasons.

A reactive coating process of the type which may be carried out using aromatic polyamines and polyisocyanates, in which the polyurea forms on the substrate after the components have been mixed, cannot be carried out using aliphatic or cycloaliphatic polyamines in the present state of the art owing to the high reactivity of these amines. Attempts have therefore been made to reduce the reactivity of aliphatic and cycloaliphatic diamines by blocking the amino groups. This means that instead of using the free diamines, the process is carried out, for example, using reaction products of the amines which aldehydes and ketones, that is to say with bisaldimines or bisketimines. Lacquers obtained on this basis have been described, for example, in German Offenlegungsschrift No. 2,325,824. (U.S. Pat. No. 3,932,357) According to the teaching in this Offenlegungsschrift, the bisaldimines used as hardeners are produced by distilling off the water formed in the reaction between a polyamine and an aldehyde.

Another method of preparing the ketimine compounds used as hardeners, which have been described in German Offenlegungsschriften No. 1,694,356 and 2,037,458 (U.S. Pat. Nos. 3,462,416, 3,463,748, 3,574,127, 3,645,907 and 3,699,063), and U.S. Pat. No. 3,715,338, consists of removing the water produced by the reaction by means of an inert drying agent, for example, a molecular sieve.

Coatings and lacquers having satisfactory properties may be obtained from such blocked diamines but the process is technically not completely satisfactory, for the following reasons:

Diamines must again be formed from the bisaldimines and bisketimines before the polymeric polyurethane urea may be formed. This requires water which is absorbed from the surroundings of the film, for example, from the moisture in the atmosphere. This means that the properties of such lacquers and coatings depend to a large extent on the moisture content of the surrounding air. Since this moisture content is, of course, liable to vary widely, difficulties in reproducing the results often arise. Moreover, the moisture enters the film from above so that only the uppermost layer becomes hardened sufficiently rapidly while the lower layers may, in some cases, take days to harden completely. In the case of relatively thick films, this has the result that the polyurethane urea obtained is non-homogeneous and the materials attain their final strength only after some time. For this reason, it is also impossible to produce polyurethane urea coatings by a reactive process from such bisketimine hardeners and isocyanate prepolymers using modern coating machines. When the two reactive components have been mixed and sprayed on the substrate, the coating runs through a drying channel and by the time it reaches the end of this channel, it must be completely hardened and in a suitable condition for stacking. However, since the time available in the machine is at most about 6 minutes, the coatings do not harden sufficiently under the conventional operating conditions.

It has now been found that these difficulties may be overcome and polyurethane ureas which harden rapidly may be obtained by a low solvent process if isocyanate prepolymers in a low solvent phase are mixed with water and with aliphatic, cycloaliphatic or araliphatic diamines in which the $NH_2$ groups are partially blocked. It is surprisingly found that when this method is employed, the rate of hardening of the films and lacquers may virtually be controlled as desired depending upon the quantity of water used and may be adapted to the given conditions. The most surprising and in fact completely unexpected result is that, in spite of the excess of water present, practically no reaction takes place between the water and the isocyanate and the coatings are in no way foamed or flawed with bubbles due to evolution of $CO_2$.

SUMMARY OF THE INVENTION

The present invention thus relates to a process, which may be a multi-stage process, for the production of polyurethane ureas from a prepolymer which contains isocyanate groups and a mixture of hardeners containing amino groups, in the presence of water, and optionally in the presence of solvents, characterized in that the mixture of hardeners comprises compounds corresponding to the following general formulae:

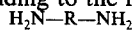　　(A)

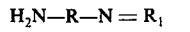  (B)

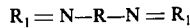  (C)

and
wherein
R represents a divalent aliphatic, cycloaliphatic or araliphatic group having from 2 to 18 carbon atoms and optionally also containing —O— or —N— (wherein X represents H, —CH$_3$, —C$_2$H$_5$, —C$_3$H$_7$ or —C$_4$H$_9$) and R$_1$ represents an aliphatic or cycloaliphatic group such as may be obtained by removal of the oxygen from a ketone or aldehyde having from 2 to 8, preferably from 3 to 6, carbon atoms, in which mixture the following molar ratios should be observed:

(A/B + C) = from about 1:20 to 1:3, preferably from about 1:10 to 1:5;

(B/C) = from about 1:2 to 2:1, preferably from about 1:1.5 to 1.5:1; and (A + B + C/H$_2$O) = from about 1:1.4 to 1:20, preferably from about 1:1.4 to 1:10.

DETAILED DESCRIPTION OF THE INVENTION

In one particular embodiment of the process according to the present invention, the hardener mixture is reacted with the isocyanate prepolymer in several, preferably two, stages. In this case, the hardener mixture (in the presence of water and optionally organic solvents) is first reacted with only a portion of the isocyanate prepolymer. The final reaction with the remaining portion of the isocyanate prepolymer is then carried out in a second stage. In this embodiment of the process according to the present invention, it is preferable to react a quantity of isocyanate prepolymer with hardener mixture in the first stage such that in the second stage the two reactants (isocyanate prepolymer and amino functional prepolymer) are present in approximately equal quantities, by volume. This not only facilitates the operation of mixing the two components, but also enables the physical properties of the hardener mixture to be varied (for example, in the direction of increasing the viscosity or increasing the solids content) without substantially affecting its chemical properties, for example, the rate of hardening isocyanate prepolymers.

The polyisocyanates used for preparation of the isocyanate prepolymers required according to the present invention should have an average isocyanate functionality of at least about 1.8. These include aliphatic, aromatic and heterocyclic polyisocyanates, such as those described, for example, by W. Siefken in Justus Liebigs Annalen der Chemie, 562, pages 75 to 136, for example ethylene diisocyanate, tetramethylene 1,4-diisocyanate, hexamethylene-1,6-diisocyanate, dodecane-1,12-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl-cyclohexane (German Auslegeschrift No. 1,202,785, U.S. Pat. No. 3,401,190), hexahydrotolylene-2,4-diisocyanate and -2,6-diisocyanate and mixtures of these isomers, hexahydrophenylene-1,3-diisocyanate and/or 1,4-diisocyanate, perhydrodiphenylmethane-2,4'-diisocyanate and/or 4,4'-diisocyanate, phenylene-1,3-diisocyanate and -1,4-diisocyanate, tolylene-2,4-diisocyanate and -2,6-diisocyanate and mixtures of these isomers, diphenylmethane-2,4'-diisocyanate and/or 4,4'-diisocyanate, naphthylene-1,5-diisocyanate, triphenylmethane-4,4',4''-triisocyanate, polyphenyl-polymethylene polyisocyanates which may be obtained by aniline-formaldehyde condensation followed by phosgenation and which have been described, for example, in British Patent Nos. 874,430 and 848,671, m- and p- isocyanatophenyl-sulphonyl isocyanates according to U.S. Pat. No. 3,454,606, perchlorinated aryl polyisocyanates, such as those described, for example, in German Auslegeschrift No. 1,157,601 (U.S. Pat. No. 3,277,138), polyisocyanates having carbodiimide groups as described in German Patent No. 1,092,007 (U.S. Pat. No. 3,152,162), diisocyanates of the type described in U.S. Pat. No. 3,492,330, polyisocyanates containing allophanate groups as described, e.g. in British Patent No. 994,890, in Belgian Patent No. 761,626 and in published Dutch Patent Application No. 7,102,524, polyisocyanates containing isocyanurate groups, e.g. as described in U.S. Pat. No. 3,001,973, in German Patent Nos. 1,022,789; 1,222,067 and 1,027,394 and in German Offenlegungsschrift Nos. 1,929,034 and 2,004,048, polyisocyanates containing urethane groups as described, e.g. in Belgian Patent No. 752,261 or in U.S. Pat. No. 3,394,164, polyisocyanates containing acylated urea groups according to German Patent No. 1,230,778, polyisocyanates containing biuret groups as described, e.g. in German Patent No. 1,101,394 (U.S. Pat. Nos. 3,124,605 and 3,201,372) and in British Patent No. 889,050, polyisocyanates prepared by telomerization reactions as described, for example, in U.S. Pat. No. 3,654,106, polyisocyanates having ester groups, such as those mentioned, for example, in British Patent Nos. 965,474 and 1,072,956, in U.S. Pat. No. 3,567,763 and in German Patent No. 1,231,688, reaction products of the above-mentioned isocyanates with acetals according to German Patent No. 1,072,385 and polyisocyanates containing polymeric fatty acid groups according to U.S. Pat. No. 3,455,883.

The distillation residues obtained from the commercial production of isocyanates and still containing isocyanate groups may also be used, optionally as solutions in one or more of the above-mentioned polyisocyanates. Mixtures of the above-mentioned polyisocyanates may also be used.

The preferred polyisocyanates for the purposes of the present invention are: 1-isocyanato-3,3,5-trimethyl-5-isocyanatomethyl-cyclohexane, perhydro-4,4'-diphenylmethanediisocyanate an the isomeric tolylenediisocyanates.

The compounds reacted with these polyisocyanates for producing the isocyanate prepolymers may be polyhydroxyl compounds having from about 2 1 to 8 hydroxyl groups and a molecular weight of from about 400 to 10,000, preferably from about 1,000 to 6,000; for example polyesters, polyethers, polythioethers, polyacetals, polycarbonates and polyester amides having at least about 2, generally from about 2 to 8 and preferably from about 2 to 4 hydroxyl groups, of the type known for the production of both homogeneous and cellular polyurethanes.

Suitable polyesters containing hydroxyl groups include reaction products of polyhydric, preferably dihydric alcohols, optionally with the addition of trihydric alcohols, and polybasic, preferably dibasic carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms and/or may be unsaturated.

The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters.

The following are examples of suitable polyhydric alcohols: ethylene glycol, propylene glycol-(1,2) and -(1,3), butylene glycol-(1,4) and (-2,3), hexanediol-(1,6), octanediol-(1,8), neopentylglycol, cyclohexanedimethanol (1,4-bis-hydroxy-methylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol and polybutylene glycols.

The polyesters may also contain a proportion of carboxyl end groups. Polyesters of lactones, such as $\epsilon$-caprolactone, or hydroxycarboxylic acids, such as $\omega$-hydroxycaproic acid, may also be used.

The polyethers used according to the present invention which have at least about 2, generally from about 2 to 8 and preferably about 2 or 3 hydroxyl groups, are also known and may be prepared, for example, by the polymerization of epoxides, such as ethylene oxide, propylene oxide, butylene oxide, tetrahydrofuran, styrene oxide or epichlorohydrin, either each on its own, e.g. in the presence of $BF_3$, or by addition of these epoxides, optionally as mixtures or successively, to starting components having reactive hydrogen atoms, such as water, ammonia, alcohols, or amines, e.g. ethylene glycol, propylene glycol-(1,3) or -(1,2), trimethylolpropane, 4,4'-dihydroxy-diphenylpropane, aniline, ethanolamine or ethylene diamine. Sucrose polyethers may also be used according to the present invention, e.g. those described in German Auslegeschrift Nos. 1,176,358 and 1,064,938. It is in many cases preferred to use polyethers which contain predominantly primary OH groups (up to about 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Patent No. 1,152,536) are also suitable, as well as polybutadienes which have OH groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the co-components.

Suitable polyacetals include, for example, the compounds which may be prepared from the reaction of glycols, such as diethylene glycol, triethylene glycol, 4,4'-dioxethoxy-diphenyl-dimethylmethane and hexanediol, with formaldehyde. Suitable polyacetals for the purposes of the present invention may also be prepared by the polymerization of cyclic acetals.

The polycarbonates containing hydroxyl groups used may be of the type known, for example, those which may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate, or with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenolformaldehyde resins or of alkylene oxides and ureaformaldehyde resins are also suitable for the purposes of the present invention.

Representatives of these compounds which may be used according to the present invention have been described, for example, in High Polymers, Vol. XVI, "Polyurethanes, Chemistry and Technology" by Saunders-Frisch, Interscience Publishers, New York, London, Volume I, 1962, pages 32 to 42 and pages 44 to 54 and Volume II, 1964, pages 5 to 6 and 198 to 199 and in Kunststoff-Handbuch, Volume VII, Vieweg-Höchtlen, Carl-Hanser-Verlag, Munich, 1966, e.g. on pages 45 to 71.

Mixtures of the above-mentioned compounds which contain at least two hydrogen atoms capable of reacting with isocyanates and have a molecular weight of from about 400 to 10,000 may, of course, also be used, for example mixtures of polyethers and polyesters.

According to the present invention, however, polyhydroxyl compounds in which high molecular weight polyadducts or polycondensates are contained in a finely dispersed or dissolved form may also be used. Such modified polyhydroxyl compounds are obtained when polyaddition reactions (e.g. reactions between polyisocyanates and amino functional compounds) or polycondensation reactions (e.g. between formaldehyde and phenols and/or amines) are carried out in situ in the above-mentioned hydroxyl group containing compounds. These processes have been described, for example, in German Auslegeschrift Nos. 1,168,075 and 1,260,142 and in German Offenlegungsschrift Nos. 2,324,134, 2,423,984; 2,512,385; 2,513,815; 2,550,796; 2,550,797; 2,550,833 and 2,550,862. Alternatively, according to U.S. Pat. No. 3,869,413 or German Offenlegungsschrift No. 2,550,860, such modified polyhydroxyl compounds may be obtained by mixing a previously prepared aqueous polymer dispersion with a polyhydroxyl compound and then removing the water from the mixture.

When modified polyhydroxyl compounds of the type indicated above are used as starting components in the polyisocyanate polyaddition process, polyurethane resins having substantially improved mechanical properties are obtained in many cases.

The starting materials used for preparation of the isocyanate prepolymers may also include low molecular weight polyols having a molecular weight below about 300, of the type known as "chain lengthening agents". Preferred polyols of this type are: ethanediol, butane- 1,4-diol and trimethylolpropane. Others which may also be used for this purpose include: propane-1,3-diol and -1,2-diol, butane-1,3-diol, -1,4-diol and -2,3-diol, pentane-1,5-diol, hexane-1,6-diol, bis-hydroxyethylhydroquinone, glycerol and N-methylhydroxylethylamine.

Preparation of the isocyanate prepolymers is carried out in a known manner by reacting the polyhydroxyl compounds and optionally chain lengthening agents and excess quantities of polyisocyanate. An NCO/OH equivalent ratio of from about 1.2 to 6.0 preferably from about 1.6 to 3.0, is used.

The hardener mixtures used according to the present invention are based on polyamines which have at least about two aliphatically or cycloaliphatically bound $NH_2$ groups. Amines of this type include, for example, ethylenediamine, trimethylenediamine, tetramethylenediamine, hexamethylenediamine, propylenediamine, isomeric mixtures of 2,2,4- and 2,4,4-trimethyl-hexamethylenediamine, 1,3- and 1,4-xylylenediamine, bis-(2-amino-ethyl)-amine and methyl-bis-(3-aminopropyl)-amine.

The preferred amines used according to the present invention are cycloaliphatic diamines. The following are examples:

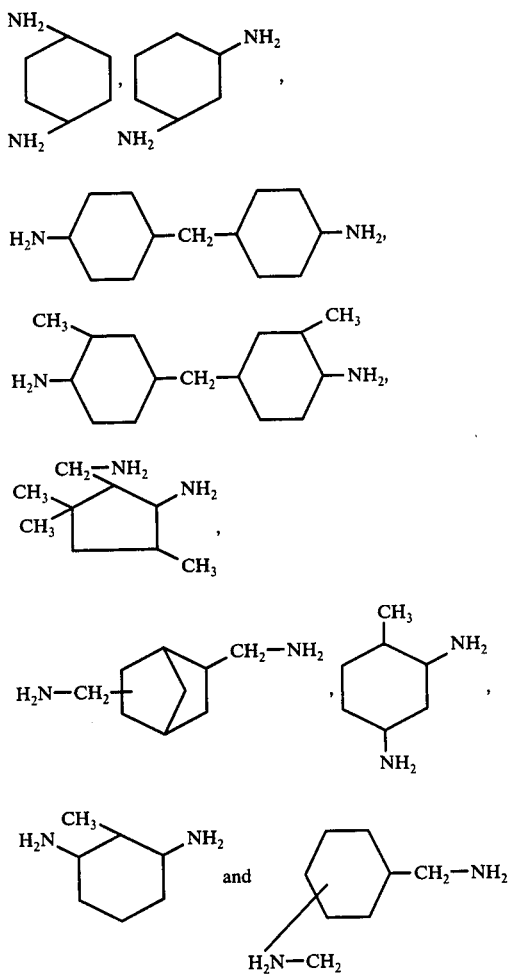

The following is particularly preferred:

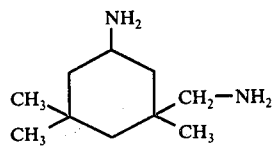

The amines are not used in the pure form in the process according to the present invention, but as mixtures with the corresponding aldimines or ketimines and water. These mixtures may be prepared, for example, as follows: The bisketimines or bisaldimines are prepared by heating diamines with excess ketone or aldehyde and may be isolated as pure substances. Water and optionally free diamine are then added to these bisketimines and bisaldimines. The quantity of water required according to the present invention is greater than the quantity used for complete hydrolysis of the ketimine or aldimine groups present. The degree of hydrolysis may be adjusted as desired by heating. The quantity of water used may be varied within the limits defined according to the present invention so that the reactivity of the hardener mixture may be completely adapted to the reactivity of the isocyanate prepolymer under the given hardening conditions. At the time of hardening, the free diamine (A), the diamine which is blocked with only one mole of ketone or aldehyde (B) and the diamine which is blocked on both amino groups (C) should be present in the hardener mixture in the proportions according to the present invention. It is particularly surprising that, in spite of the large excess of water, most of the amino groups remain blocked at room temperature and only a relatively small quantity is present as free diamine. The composition of the hardener mixture may easily be determined by various analytical methods (e.g. by gas chromatography).

If desired, however, the hardener mixture used according to the present invention may be prepared without isolating the bisketimine or bisaldimine. In that case, the diamine, for example, is boiled under reflux with the ketone and/or aldehyde without removal of the water liberated. A mixture of diamine, partially blocked diamine and bisketimine or bisaldimine is thereby obtained, but owing to its insufficient water content it is not yet suitable for the process according to the present invention. Addition of a further quantity of water results in a suitable hardener mixture in which the proportions of the components are within the defined limits.

The aldehydes or ketones which may be used according to the invention are those having from about 2 to 8, preferably from about 3 to 6 carbon atoms. The following are examples: acetaldehyde, propionaldehyde, butyraldehyde, isobutyraldehyde, acetone, methylethylketone, methylisobutylketone, diisopropylketone, cyclopentanone and cyclohexanone.

The process according to the present invention is advantageously carried out at a low solvent content. The proportion of solvent in the reaction mixture is preferably less than about 50%, by weight, most preferably less than about 40% by weight, based on the total weight of the reaction mixture. One of the main reasons for using solvents in the hardener mixture is to facilitate dosing. The following are examples of suitable solvents which may be used both for the isocyanate prepolymer and for the hardener mixture: hydrocarbons (optionally halogenated), such as toluene, xylene or chlorobenzene; esters, such as ethylglycolacetate and ethylacetate: and ketones, such as acetone, methylethylketone, methylisobutylketone and cyclohexanone. Other commonly used solvents, such as dimethylformamide, may also be used.

According to the present invention, however, it is preferred to use non-toxic, relatively non-polar solvents. Alcohols may also be used as solvents for the hardener mixture, for example, isopropanol, isobutanol, ethanol or ethyleneglycolmonomethylether. The reaction between the isocyanate prepolymer and the hardener mixture is generally carried out at temperatures of from about 10° to 100° C, preferably from about 50° to 80° C, using isocyanate/amino equivalent ratio (including both free and blocked amino groups) of from about 0.9 to 1.2, preferably from about 0.95 to 1.1, most preferably from about 1.0 to 1.05. If foamed coatings are to be produced, however, the reaction temperature may be raised to about 200° C, preferably to about 150° C. The blowing agents used in such a case are preferably substances which liberate gases when heated, e.g. azodicarbonamide (especially in the presence of heavy metal salts, so-called "kickers"), diphenylsulphone-3,3-sulphohydrazide, 5-morpholyl-thiotriazole or azoisobutyric acid dinitrile.

The process according to the present invention is used in particular, for reactive coatings or lacquerings. Its main advantage over the known art is that completely hardened coatings and lacquers which undergo no further change in their properties when stored may be obtained in a short time, which may be varied within certain limits. Another important advantage is that no catalysts liable to have a deleterious effect on the properties of the coatings are required for accelerating or slowing down the hardening reaction. According to the present invention, the reactivity is controlled simply by the quantity of water added.

Known auxiliary agents and additives, such as levelling agents, thickeners and pigments, may also be used according to the present invention.

The process according to the present invention may be used for the production of coatings on textiles, leather and cellular or non-cellular synthetic resins and for lacquering paper, wood or metal. Both direct processes and reversal processes (using separating foils, separating papers or matrices as intermediate supports) may be employed.

The process according to the present invention is illustrated in the following Examples. (The figures given denote parts, by weight, or percentages, by weight, unless otherwise indicated).

EXAMPLES (a) Preparation of isocyanate prepolymers

Prepolymer A 444 g of 1-isocyanato-3-isocyanatomethyl-3,5,5-trimethyl-cyclohexane (isophorone diisocyanate) are introduced into the reactor. 9 g of butane-1,4-diol followed by 9 g of trimethylolpropane followed in turn by 1600 g of a hydroxyl polyester of adipic acid, ethyleneglycol, diethyleneglycol and butane-1,4-diol having a hydroxyl number of 56 and a molecular weight of 2000 are added, with stirring at room temperature. The reaction mixture is heated and maintained at a temperature of 110° C for about 1 hour (until the isocyanate content is constant). After cooling to 65° C, the reaction mixture is diluted with 412 g of methylethylketone and 206 g of toluene to give a 77% solution.

The prepolymer solution has a viscosity of 1000 cP at 20° C and an isocyanate content of 2.95%. The isocyanate equivalent is calculated from this to be 1425 g.

Prepolymer B 348 g of 2,4-diisocyanatotoluene are introduced into the reactor. 1700 g of a hydroxyl polyester of adipic acid, neopentylglycol and hexane-1,6-diol having a hydroxyl number of 66 and molecular weight of 1700 are added, with stirring, at room temperature. The reaction mixture is heated and maintained at 60° C for 1 hour. The temperature is then raised to 80° C and the reaction is continued at a constant isocyanate content. The reaction mixture is then diluted to give an 80% solution by the addition of 520 g of toluene.

The prepolymer solution has a viscosity of 2500 cP at 25° C and an isocyanate content of 3.26%. The calculated isocyanate equivalent is 1290 g.

Prepolymer C

In prepolymer C, the adipic acid polyester used in Prepolymer A is replaced by a polycarbonate based on hexanediol-(1,6) and butanediol-(1,4) having a hydroxyl number of 56 and a molecular weight of 2000. The composition of the reaction mixture and method of procedure are otherwise the same as described for Prepolymer A. The 77% prepolymer solution in methylethylketone has a viscosity of 1500 cP at 25° C and an isocyanate content of 2.9%. The isocyanate equivalent calculated from this is 1450 g.

Prepolymer D 444 g of isophorane diisocyanate and 2000 g of hydroxylpolyether based on propanediol-(1,2) and propylene oxide and having a hydroxyl number of 56 and a molecular weight of 2000 are mixed in the reactor at room temperature and reacted at from 110° to 120° C to constant isocyanate content. The cooled prepolymer has a viscosity of 7000 cP at 20° C and an isocyanate content of 3.4%. This corresponds to a calculated isocyanate equivalent of 1230 g.

(b) Preparation of the hardener mixtures (The hardener mixtures on which the process according to the present invention is based will be briefly referred to hereinafter as "hardeners according to the present invention").

Hardener 1

A mixture of 170 g of 3,3,5-trimethyl-5-aminomethyl-cyclohexylamine (IPDA), 13 g of water and 417 g of methylethylketone is boiled under reflux for 2 hours. When cool, the mixture is ready for use as hardener.

The 170 g (1 mol) of IPDA used in the mixture are present in the following form:

(A) 12.9 mol % as free IPDA
(B) 41.6 mol % as

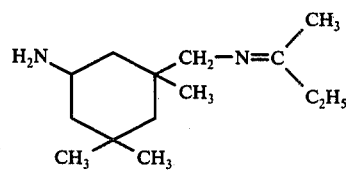

(C) 45.5 mol % as the bis-methylethylketoneketimine of IPDA (the composition was calculated from gas chromatographic analysis of the mixture).

The mixture also contains a total of 37.88 g of water (the theoretically required quantity of water for hydrolytic decomposition of the ketimine groups to amino groups is 24.88 g).

The molar ratios of the individual hardener components have the following values:

$$\frac{A}{B+C} = \frac{12.9}{41.6 + 45.5} = \frac{1}{6.75}$$

$$\frac{B}{C} = \frac{41.6}{45.5} = \frac{1}{1.1}$$

$$\frac{A+B+C}{H_2O} = \frac{1.0}{2.1}$$

The $NH_2$ equivalent of the hardener mixture is 300 g.

Hardener 2 (Comparison)

A hardener mixture of 170 g of IPDA and 430 g of methylethylketone is prepared without additional water in a manner analagous to hardener 1. Gas chromatographic analysis of this hardener mixture indicates that the molar ratios of the individual hardener components (see hardener 1) to the water present are as follows:

$$\frac{A+B+C}{H_2O} = \frac{1.0}{1.385}$$

The $NH_2$ equivalent weight of the hardener mixture is 300 g.

Hardener 3

A mixture of 170 g of 3,3,5-trimethyl-5-aminomethyl-cyclohexylamine (IPDA) and 300 g of methylisobutyl-ketone (MIBK) is boiled on a water separator until 36 g of water have been removed. The mixture left behind is freed from excess methylisobutylketone on a rotary evaporator. The residue, consisting of 334 g of the bis-methylisobutylketimine of IPDA, is an almost colorless liquid having a boiling point of 160° C at 0.2 Torr.

A mixture of 334 g of the bis-methylisobutylketimine of IPDA, 72 g of water (this is 36 g of water more than that required for complete hydrolysis of the bisketimine) and 94 g of isopropanol is maintained at room temperature for 24 hours. The hardener mixture obtained at the end of this time, consisting of free IPDA, mono- and di-blocked IPDA and water, has a hardening activity on isocyanate prepolymers corresponding to that of hardener mixture 1.

The $NH_2$ equivalent weight of the hardener mixture is 250 g.

Hardeners 4–7

The hardener mixtures according to the present invention described below are analogous to hardeners 1 and 3 in having a varying quantity of water depending on the nature of the polyamine and blocking agent used.

The hardener mixtures are prepared from the components indicated in the following Table by the method described for hardener 1.

| Hardener | Amine component | Blocking agent | Water | Amine Equivalent |
|---|---|---|---|---|
| 4 | 116 g of hexa-methylenediamine; 170 g of IPDA | 688 g of methyl-ethylketone; 130 g of methyl-isobutylketone | 36 g | 285 g |
| 5 | 144.5 g of IPDA; | 420.8 g of methylethylketone | 21.6 g | 300 g |
| 6 | 13.1 g of bis-3-aminopropylamine 238 g of 4,4'-diamino-3,3'-dimethyl-dicyclohexyl-methane | methylethylketone 350 g of methylethylketone | 12 g | 300 g |
| 7 | 136 g of 1,4-bis-aminomethyl-benzene | 144 g of isobutyraldehyde, 296 g of methylethylketone | 24 g | 300 g |

(c) Preparation of polyurethane ureas

The reactivity towards isocyanate prepolymers of the hardener mixtures 1 and 3 to 7 according to the present invention is such that during the necessary pot-life, which is, on average, from two to five minutes, they cause sufficient hardening to result in the desired setting times of, on average, from about 4 to 8 minutes under ordinary conditions of temperature and pressure.

By "pot-life" is meant that length of time after which the mixture no longer has a sufficiently low viscosity (about 150,000 cP) to enable it to be sprayed by the conventional methods at a temperature of about 25° C.

EXAMPLE 1

Split leather is coated by the reversal process, using a spray gun machine designed for two components and external mixing. The spray gun machine comprises as its main components a heatable storage container for the prepolymer, a storage container for the hardener, separate dosing devices for the hardener and the prepolymer and, for external mixing and atomization of the components, a spray gun having a concentric nozzle, and separate feed devices for supplying the prepolymer, the hardener and compressed air.

Prepolymer A is introduced into the heatable storage container and heated to 60° C to lower its viscosity. Hardener mixture 1 is introduced into the container provided for it, together with 10%, by weight, of pigment per equivalent of hardener. The addition of pigment raises the $NH_2$ equivalent of the hardener mixture to 330 g. The prepolymer and hardener are delivered into the spray gun in the ratios corresponding to their equivalent weights by way of separate tubes with interposed dosing devices. The rate of feed is variable and may be, for example, 480 g of prepolymer A and 111 g hardener 1 (including pigment) per minute. At the exit from the spray gun, the two components are mixed by the air currents produced by compressed air (operating pressure 4.5 kg/cm²). For alternating delivery, the gun is moved backwards and forwards about 28 times per minute over a width of 100 cm.

A matrix coated with silicone rubber and carrying the imprint of natural leather is moved under the gun at a speed of 1.6 meters per minute. The composition sprayed on the matrix spreads to form a film and begins to set about 1 minute after it has been sprayed. The split leather which is required to be coated is placed on the reactive mass and pressure is applied. The whole coating is then passed through a drying channel heated to 80° C. After about 6 minutes, calculated from the moment of spraying, the coating may be stripped from the matrix without sticking.

The polyurethane urea layer has a thickness of from about 0.22 to 0.25 mm.

The coated split leather has a grain deceptively similar to that of natural leather and within a short time it is dry and may be stacked ready for processing on conventional shoe manufacturing machines. The bond between the coating and the split leather is excellent and the hand is pleasantly dry.

The coated leather samples withstand bending in the flexometer test as follows:
1. dry, over 200,000 bending movements without damage,
2. wet, over 100,000 bending movements without damage,
3. at −25° C, well over 10,000 bending movements without damage.

The hot ironing test at 150° C is completed without visible damage. The polyurethane urea elastomer has the following mechanical properties:

| | |
|---|---|
| Tensile strength: | 180 kp/cm$^2$ |
| Tear propagation resistance: | 30 kp/cm$^2$ |
| Elongation at break: | 800 % |

EXAMPLE 2 (Comparison Example)

Prepolymer A and hardener 2 containing no additional water are worked-up as described in Example 1.

The system is found to have the following two serious disadvantages:
1. The mixture of hardener and prepolymer sprayed on the matrix does not set sufficiently rapidly. When the split leather is applied, the mixture is still so liquid that it penetrates the substrate. As a result of this, the fibrous surface of the split leather is not completely covered by the coating, but projects through it.
2. At the end of the machine, 6 minutes after the moment of spraying, the reaction of the coating is not completed. The coated leather still sticks to the matrix and cannot be stripped off without damage.

EXAMPLE 3

Prepolymer A and hardener 1 are mixed in the proportions of their equivalent weights at room temperature. The mixture has a pot-life of 3 minutes. Films 0.5 mm in thickness are formed on a silicone paper substrate by means of a film drawing apparatus. These films are already completely hardened after 7 minutes and may then be stripped from the substrate without sticking.

EXAMPLE 4 (Comparison Example)

Prepolymer A and hardener 2 are mixed in the proportions of their equivalent weights at room temperature. Although this mixture has a longer pot-life (about 11 minutes) films 0.5 mm in thickness prepared as described in Example 3 are hardened on the surface only after 25 minutes. Underneath the hardened surface, the films remain soft over a considerable period. This Example also illustrates that hardener 2 obtained according to the known art is not suitable.

EXAMPLES 5 and 6

(a) Prepolymer B is used to prepare two mixtures, one with hardener 4 and the other with hardener 5, the two components being in each case mixed at room temperature in the proportions corresponding to their equivalent weights. Both mixtures have a pot-life of two minutes. Films 0.5 mm in thickness prepared from the mixture in the manner described in Example 3 are hardened after 4 minutes and may then be stripped from their substrate without sticking. One surprising finding is that foaming due to liberation of $CO_2$ in the course of a possible reaction between isocyanate and water is neither detected during mixing nor in the set film.

(b) Prepolymer B is reacted successively with hardeners 4 and 5 in the coating machine by the procedure described in Example 1. The coated split leathers leaving the drying channel at the end of the machine are very dry and have reacted completely. The polyurethane urea layer carried an exact imprint of the matrix structure. No bubbles may be detected in the surface.

Hardening and drying of the sprayed reactive components proceed extremely rapidly without deleteriously affecting the levelling quality and adherence of the polyurethane urea layer. Application of external heat to accelerate the reaction between the components is, therefore, unnecessary. This property of the hardener according to the present invention provides the possibility of major simplification of the apparatus and hence economy.

EXAMPLE 7

Prepolymer C is heated to 60° C and then mixed with hardener 7 in proportions of their equivalent weights. The mixture has a pot-life of 6 minutes. Films 0.5 mm in thickness prepared during this time by the method described in Example 3 are tack-free and have a dry hand after 9 minutes. Since the polyurethane urea film described here is based on a polycarbonate, it has excellent resistance to hydrolysis.

EXAMPLE 8

600 g of hardener 6, 42.5 g of 3,3,5-trimethyl-5-aminomethyl-cyclohexylamine, 40 g of water and 92.5 g of methylethylketone are heated to boiling and the mixture is left to cool. 725.0 g of prepolymer C are added with stirring to the amine mixture which has been cooled to from 40° to 45° C. This hardener mixture according to the present invention has a $NH_2$ equivalent of 750.0 g. It is a clear solution having a viscosity of 90 cP.

The hardener mixture is worked-up in the coating machine described in Example 1 in combination with Prepolymer D. The prepolymer is heated to 80° C in the container of the machine for the purpose of lowering its viscosity. The prepolymer feed tube leading to the spray gun is heated to 100° C. 273 g of hardener per minute and 27 g of pigment per minute are supplied for 480 g of prepolymer D. At the end of the machine, 6 minutes after spraying of the reactive components, the coating may be stripped from the matrix without sticking. The coated split leather has a very dry hand. The coating is remarkably resistant to hydrolysis.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of polyurethane ureas comprising reacting a prepolymer containing isocyanate groups and a hardener mixture containing amino groups in the presence of water, and optionally in the presence of solvents, characterized in that the hardener mixture comprises compounds corresponding to the following general formulae $H_2N-R-NH_2$ (A)

$H_2N-R-N=R_1$ (B)

$R_1=N-R-N=R_1$ (C)

wherein
R represents a divalent aliphatic, cycloaliphatic or araliphatic group having from 2 to 18 carbon atoms which may in addition contain —O— or $$-N- \\ | \\ X$$

(wherein X represents $-H$, $-CH_3$, $-C_2H_5$, $-C_3H_7$ or $-C_4H_9$); and
$R_1$ represents an aliphatic or cycloaliphatic group such as is formed by removal of oxygen from a ketone or aldehyde having from 2 to 8 carbon atoms; in which mixture the following molar ratios are to be observed:
(A/B + C) = from about 1:20 to 1:3
(B/C) = from about 1:2 to 2:1 and
A + B + C/H$_2$O = from about 1:1.4 to 1:20.

2. The process of claim 1 wherein the molar ratio of A/B + C is from about 1:10 to 1:5, the molar ratio of B/C is from about 1:1.5 to 1.5:1 and the molar ratio of A + B + C/H$_2$O is from about 1:1.4 to 1:10.

3. The process of claim 1 wherein the reaction temperature is between about 10° to 200° C.

4. The process of claim 3 wherein the reaction temperature is between about 10° to 100° C.

5. The process of claim 1 wherein the isocyanate/amino equivalent ratio is from about 0.9 to 1.2.

6. The process of claim 1 wherein the prepolymer containing isocyanate groups is produced by reacting polyisocyanates having an average isocyanate functionality of at least about 1.8 with polyhydroxyl compounds having from about 2 to 8 hydroxyl groups and a molecular weight of from about 400 to 10,000 at an NCO/OH equivalent ratio of from about 1.2 to 6.0.

7. The process of claim 6 wherein the polyisocyanates are selected from the groups consisting of 1-isocyanato-3,3,5-trimethyl-5-isocyanatomethyl-cyclohexane, perhydro-4,4'-diphenylmethane-diisocyanate and the isomeric tolylenediisocyanates and wherein the polyhydroxyl compounds are selected from the group consisting of polyesters, polyethers, polythioethers, polyacetals, polycarbonates, and polyester amides.

8. The process of claim 6 wherein polyols having a molecular weight of less than about 300 are present as chain-lengthening agents.

9. The process of claim 1 wherein the hardener mixtures are based on polyamines having at least about two aliphatically or cycloaliphatically bound NH$_2$ groups.

10. The process of claim 9 wherein the polyamines are selected from the group consisting of

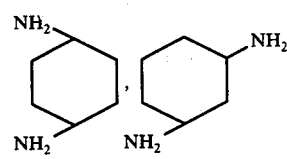

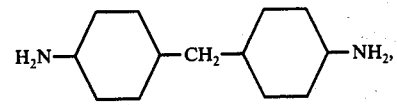

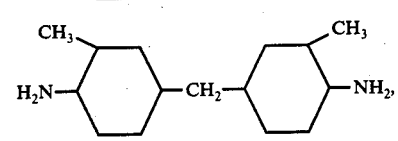

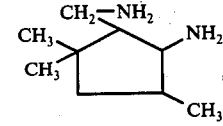

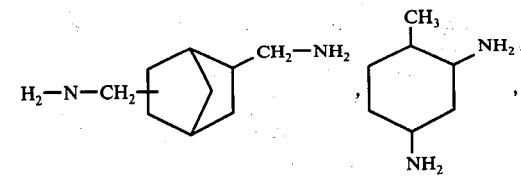

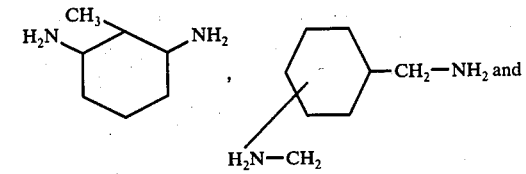

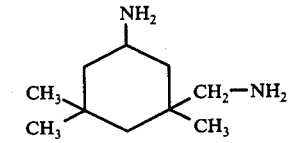

11. The process of claim 1 wherein solvents are present in less than about 50% by weight, based on the total weight of the reaction mixture.

* * * * *